United States Patent [19]

Kato

[11] Patent Number: 5,615,090
[45] Date of Patent: Mar. 25, 1997

[54] HEADLIGHT FOR VEHICLE

[75] Inventor: Hideyuki Kato, Nishio, Japan

[73] Assignee: Nippondenso Co., Ltd., Kariya, Japan

[21] Appl. No.: 555,333

[22] Filed: Nov. 8, 1995

[30] Foreign Application Priority Data

Dec. 21, 1994 [JP] Japan .................................. 6-318882

[51] Int. Cl.$^6$ ...................................................... F21V 8/00
[52] U.S. Cl. ............................ 362/32; 362/61; 362/327;
362/332; 385/32; 385/33; 385/901
[58] Field of Search ................................ 385/32, 33, 901;
362/32, 61, 80, 327, 331, 332, 31

[56] References Cited

U.S. PATENT DOCUMENTS

| | | | |
|---|---|---|---|
| 4,218,726 | 8/1980 | Fukasawa et al. | 362/32 |
| 4,883,333 | 11/1989 | Yanez | 385/901 |
| 5,365,412 | 11/1994 | Koppolu et al. | 362/32 |
| 5,436,806 | 7/1995 | Kato | 362/32 |

FOREIGN PATENT DOCUMENTS 623780  11/1994  European Pat. Off. .
6-068702  3/1994  Japan .

Primary Examiner—Alan Cariaso
Attorney, Agent, or Firm—Cushman, Darby & Cushman IP Group of Pillsbury Madison & Sutro LLP

[57] ABSTRACT

A lens member for a flat zone illumination of a headlight has a light incident surface which receives light beams introduced from a centralized light source through a fiberoptic cable, a light emitting surface which has a cylindrical lens portion for irradiating the light beams in front of a car and a curved light conducting portion between the surfaces which has total reflecting surfaces on the peripheries thereof. The light emitting surface is formed to slightly incline with respect to a light axis of a hot zone lens member so that the light beams are refracted in parallel with the light beams for the hot zone illumination when they are emitted from the surface and increase the brightness of the flat zone illumination.

14 Claims, 9 Drawing Sheets

HEADLIGHT FOR VEHICLE

CROSS REFERENCE TO RELATED APPLICATION

The present application is based on and claims priority from Japanese Patent Applications Hei 6-318882 filed on Dec. 21, 1994, the contents of which are incorporated herein by reference.

BACKGROUND OF THE INVENTION

1. Field of the Invention

The present invention relates to a headlight for a vehicle, and more particularly, to a headlight for a vehicle having a centralized light source.

2. Description of Related Art

Recently, a discharge-tube-type headlight system in combination with a control circuit has been developed. Since the control circuit is considerably expensive, a single centralized discharge-tube is disposed in a portion of the vehicle and light beams are introduced through fiber optic cables to portions where right and left head lights are located. For instance, Japanese Patent Unexamined Publication Hei 6-68702, which was filed by the assignee of this application, discloses an example. The headlight system includes a centralized light source 1 disposed in a front central portion of the vehicle and left and right head lights L and R. The centralized light source 1 has a generally cylindrical casing in which a discharge tube 1a as a linear light source 1 at an axially central portion. Reference characters FL and FR indicate left and right wheels.

The left head light L is composed of a lens unit 2 disposed in a front left portion of the vehicle and a fiberoptic cable 3 which connects the centralized light source 1 and the lens unit 2. The right head lamp R is composed of a lens unit 4 disposed in a front right portion of the vehicle and a fiberoptic cable 5 which connects the centralized light source 1 and the lens unit 4.

When the lens units and the fiberoptic cables are connected, the fiberoptic cables have to be bent very carefully in order to minimize the light transmission loss. In order to dispose the fiberoptic cable without paying the above attention into account, a curved light conducting portion is formed in the lens unit as disclosed in U.S. Pat. No. 5,436,806 filed by the same assignee. FIG. 7 is a perspective view illustrating such lens unit, and FIG. 8 is a schematic plan view thereof.

In the lens unit shown in FIGS. 7 and 8, the lens unit is composed of two kinds of lens members having different lens characteristics. A first lens member 30c has a lens function only in the vertical direction and forms a flat zone illumination. A second lens member 40 is a common omni-directional lens and, therefore, the light beams are magnified and focused to an inverted original image, thereby forming a hot zone illumination which illuminates comparatively narrow area brightly. Shades 20 are disposed between the first and second lens members 30c and 40 so that glaring light beams against passing or meeting vehicles can be cut, thereby forming the low beam illumination of the headlight. The second lens member 40 for the hot zone illumination has a reflecting surface R which is beveled at an angle of 45 degree with respect to an incident axis X—X and located opposite the incident portion. Therefore, the incident light beams from the fiberoptic cable 10 are totally reflected by the reflecting surface R, turned by 90 degree and emitted from a light emitting surface 46.

The first lens 30c for the flat zone illumination has a 90-degree-curved-portion 30cR so that light beams are emitted therefrom at an angle of 90 degree from the direction of the incident light beams. The entire periphery of the 90-degree-curved-portion 30cR is exposed to material having a small refracting index such as air, and the sorrounding surfaces of the 90-degree-curved-portion totally reflect all the incident light beams to emit all incident beams from the light emitting surface 36c.

However, the above described lens having the 90-degree-curved-portion 30cR can not provide a uniform and sufficient illumination zones due to geometric form of the 90-degree-curved-portion as shown in FIG. 9 which shows illumination characteristics on a screen located 10 m in front of the lens 30c having the 90-degree curved portion. A curved line A represents a zone where the illuminance is 60 lux, a curved line B represents a zone where the luminance is 40 lux and a curved line C represents a zone where the luminance is 20 lux. The zone C is 10 degree high (in a V—V direction) and 120 degree wide (in a H—H direction).

SUMMARY OF THE INVENTION

The present invention is made in view of the above problem, and has a main object to provide an improved headlight for a vehicle which has a lens member having a curved-portion.

Another object of the present invention is to provide a headlight for a vehicle which includes a centralized light source, a first lens member having a curved portion for a flat zone illumination and a second lens member for a hot zone illumination, a fiberoptic cable for introducing light beams from the light source to the first and second lens members, in which a line tangent to the light emitting surface of the first lens inclines at a designated angle with respect to an axis of the incident light of the first lens member so as to refract the light beams in parallel with light beams for the hot zone illumiation.

With the inclination of the light emitting surface, the bent angle of the curved portion can be formed less than 90 degree so that brighter illumination can be provided.

Another object of the present invention is to provide a headlight for a vehicle, in which vertical reflecting surfaces of the curved portion includes inclined surfaces gradually separating from each other toward the light emitting surface, which narrow the light beams emitting from the light emitting surface and increase the brightness of the illumination further.

BRIEF DESCRIPTION OF THE DRAWINGS

Other objects, features, and characteristics of the present invention as well as the functions of related parts of the present invention will become clear from a study of the following detailed description, the appended claims and the drawings. In the drawings:

DETAILED DESCRIPTION OF THE PREFERRED EMBODIMENT (First Embodiment)

A headlight for a vehicle according to the present invention is described with reference to the appended drawings.

Figure 1A:
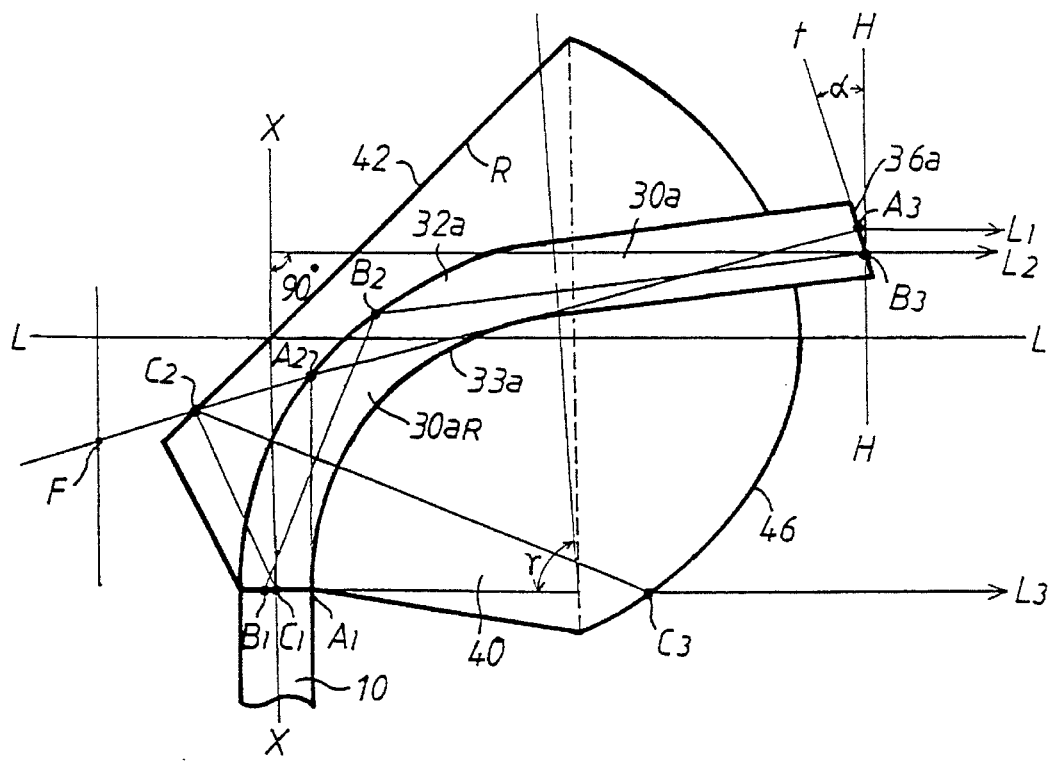
FIG. 1A is a schematic plan view and FIG. 1B is a schematic side view illustrating respectively a main part of a lens unit according to a first embodiment of the present invention.
Figure 1B:
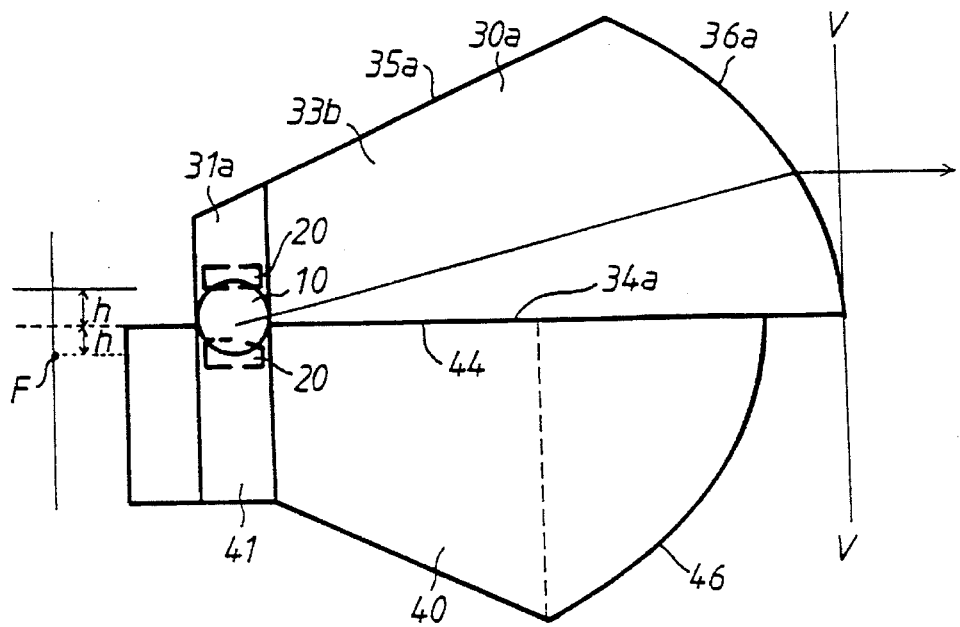
Figure 6:
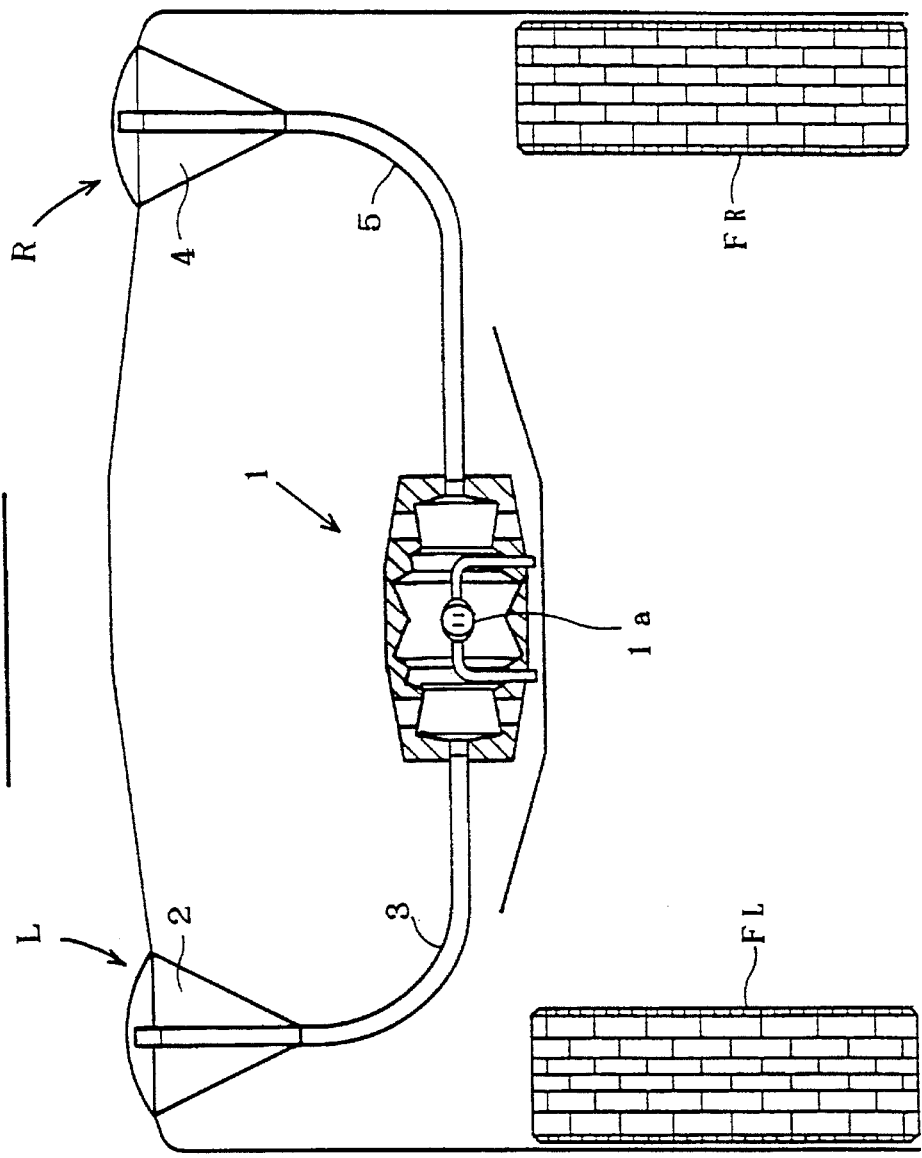
FIG. 6 is a schematic view illustrating a conventional headlight system having a centralized light source.
Figure 7:
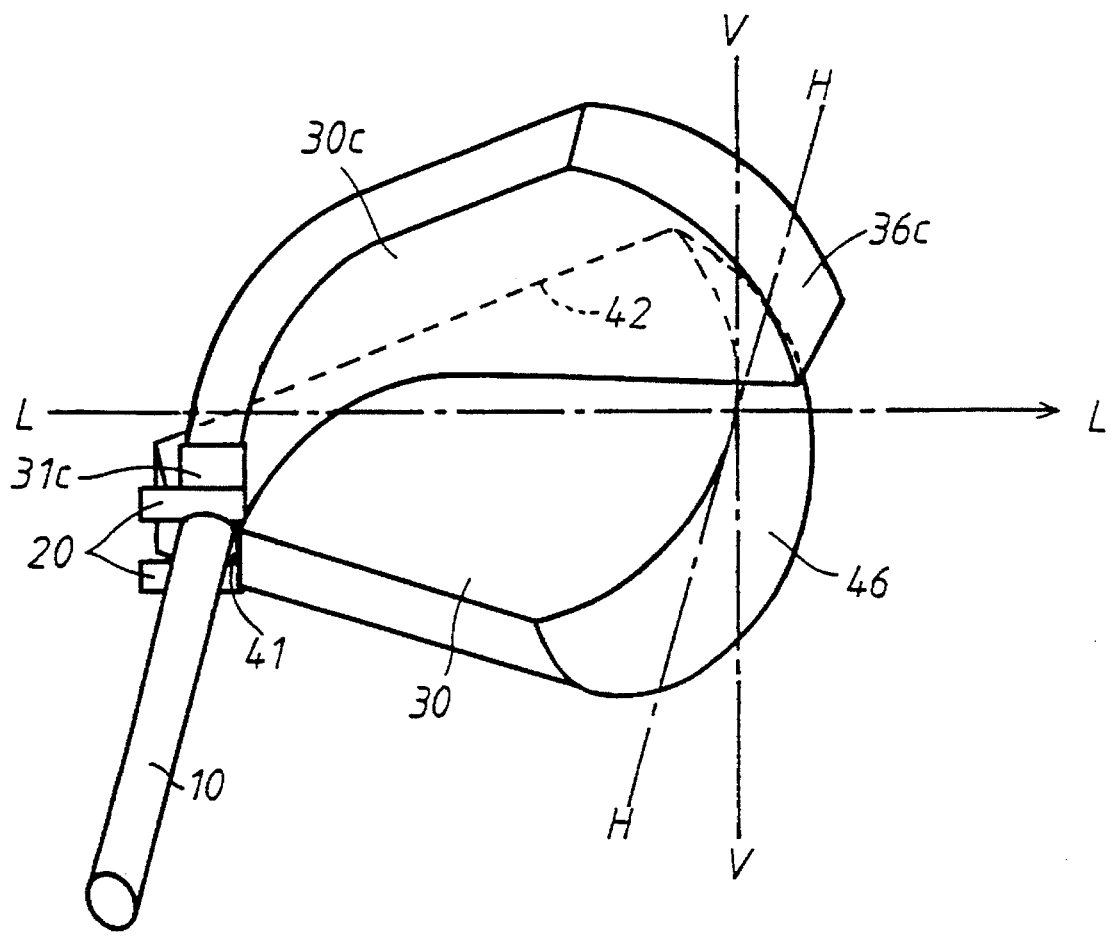
FIG. 7 is a perspective view illustrating a lens unit for the headlight system illustrated in FIG. 6.
Figure 8:
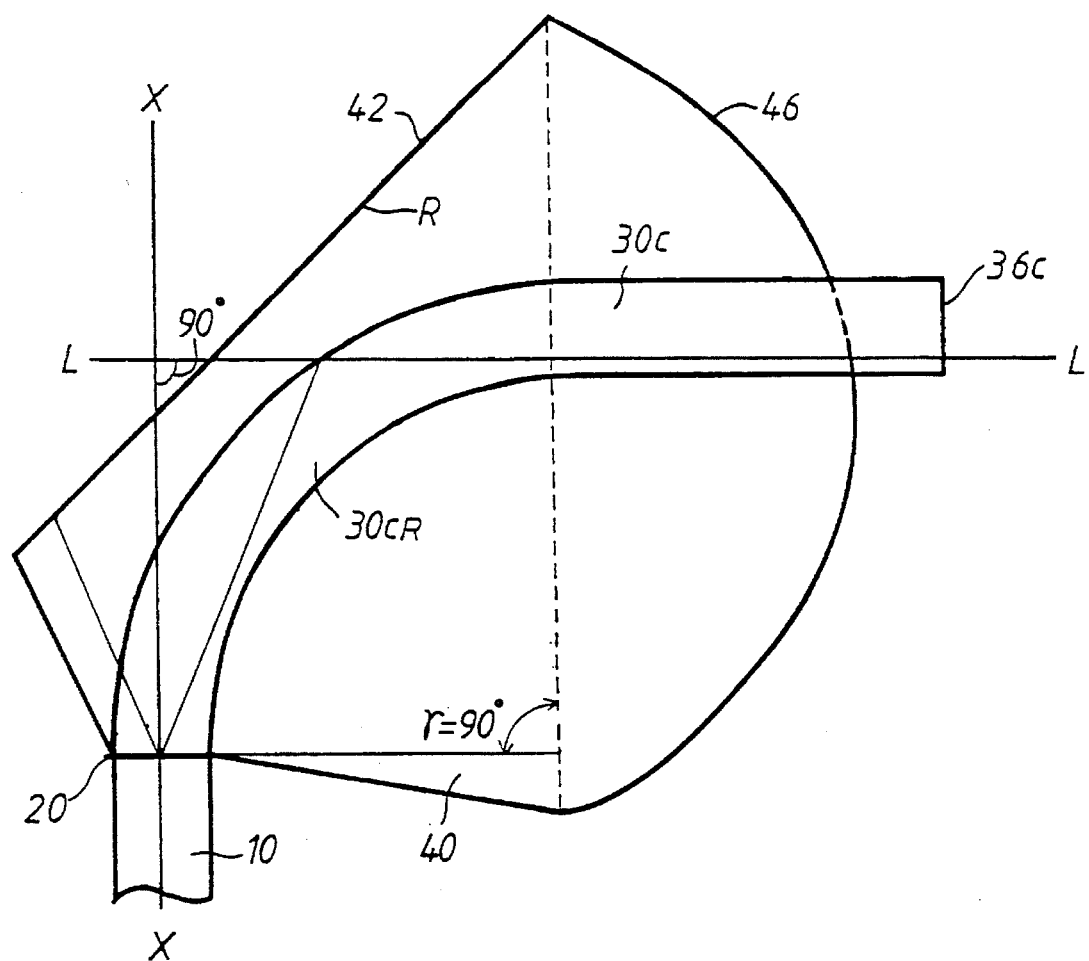
FIG. 8 is a plan view illustrating a lens unit for the headlight system illustrated in FIG. 6.

FIG. 1A and FIG. 1B illustrate a main portion of a headlight according to a first embodiment of the present invention. Light beams emitted from a centralized light source (e.g. a reference numeral 1 in FIG. 6) are introduced into a fiberoptic cable 10 to a shade 20 which forms the light beams into a illumination profile. Then the light beams forming the illumination profile are introduced to a lens unit which is composed of a first lens member 30a and a second lens member 40.

The fiberoptic cable 10 is composed of a rod core and cladding. The cladding is made of material which has a smaller refractive index than the rod core in order to provide total internal reflection of light.

Shade member 20 is made of light shading material such as a metal plate disposed between the lens members 30a and 40 and the fiberoptic cable 10. The shade member 20 is formed to have a profile suitable for the illumination profile for the low beam of the headlight.

The lens members 30a and 40 are made of material having good light transmission characteristics such as polycarbonate or acrylic resin. The second lens member 40 is shaped into a half section of a cone expanding toward a light emitting surface 46.

The lens member 40 has a light incident surface 41 and a beveled side wall 42 formed at an angle of 45 degree from the light incident axis at a side opposite the light incident surface 41. The side wall 42 functions as a total reflection surface R for the incident light from the fiberoptic cable 10. An upper surface 44 of the second lens 40 also functions as a total reflection surface, which faces closely a bottom surface 34a of the first lens 30a for the flat zone illumination. The light emitting surface 46 of the second lens member 40 has spherical surface having a designated radius so that all the incident light beams are magnified and focused to an inverted original image, thereby forming a hot zone illumination which illuminates comparatively narrow area brightly.

Therefore, the incident light beams of the second lens 40 from the fiberoptic cable 10 are reflected by the reflecting surface R and the upper surface 44, introduced along a light axis line L—L, bent at an angle 45degree from the incident light beams and emitted from the light emitting surface 46. An incident light beam at a point C1 of the incident surface 41 is reflected by a point C2 on the side wall and refracted by a point C3 on the light emitting surface 46 to form a light beam in parallel with the light axis L—L for the hot zone illumination.

Some reflecting layer such as aluminum or silver coating can be provided on the side wall 42 instead of forming the total reflecting surface.

The first lens member 30a for the flat zone illumination according to the first embodiment has a light incident surface 31a receiving the light beams from the fiberoptic cable 10, a light emitting surface 36a which is formed into a cylindrical lens, side walls which function as vertical reflecting surfaces, a curved portion 30aR, an upper surface 35a ascending toward a light emitting surface 36a and the bottom surface 34a which functions as a total reflection surface.

The curved portion 30aR is formed to have a curved angle γ which is less than 90 degree, for instance, between 80 and 85 degree, preferably, 83 degree in the first embodiment.

The light emitting surface 36a of the first lens is directed so that a horizontal tangential line t of the light emitting surface 36a inclines at an angle α between 12 degree and 18 degree, preferably, 15 degree to a line H—H which is parallel to the incident light axis X—X at the light incident surface. In other words, the normal line of the light emitting surface 36a inclines at the angle α from the light axis L—L of the first lens member 30a for the hot zone illumination, so that the light beams emitted from the light emitting surface 36a are refracted by a half of the inclined angle α to the right (the opposite direction of inclination of the surface 36a) and become in parallel with the light axis L—L of the second lens member 40.

The focal point of the cylindrical lens of the light emitting surface 36a is located at a point F and the focal length is equal to the shortest optical path A1–A2–A3 in FIG. 1. The point A1 of the shortest optical path is located symmetrical to the focal point F with respect to a line tangent to the point A2. The focal point F is located vertically (in a direction V—V) h, which is a half of an opening between the shade members, lower than the bottom surface 34a as shown in FIG. 1B.

An incident light beam at the point A1 on the incident surface 31a is reflected at the point A2 on the left wall 32a, refracted at the point A3 of the light emitting surface 36a and emitted therefrom as a light beam L1 in parallel with the light axis L—L. On the other hand, a light beam incident at a point B1 of the light incident surface 31a is reflected at a point B2 of the left wall 32a, refracted at a point B3 on the light emitting surface 36a and emitted therefrom as a light beam L2 in parallel with the light axis L—L.

Figure 2:
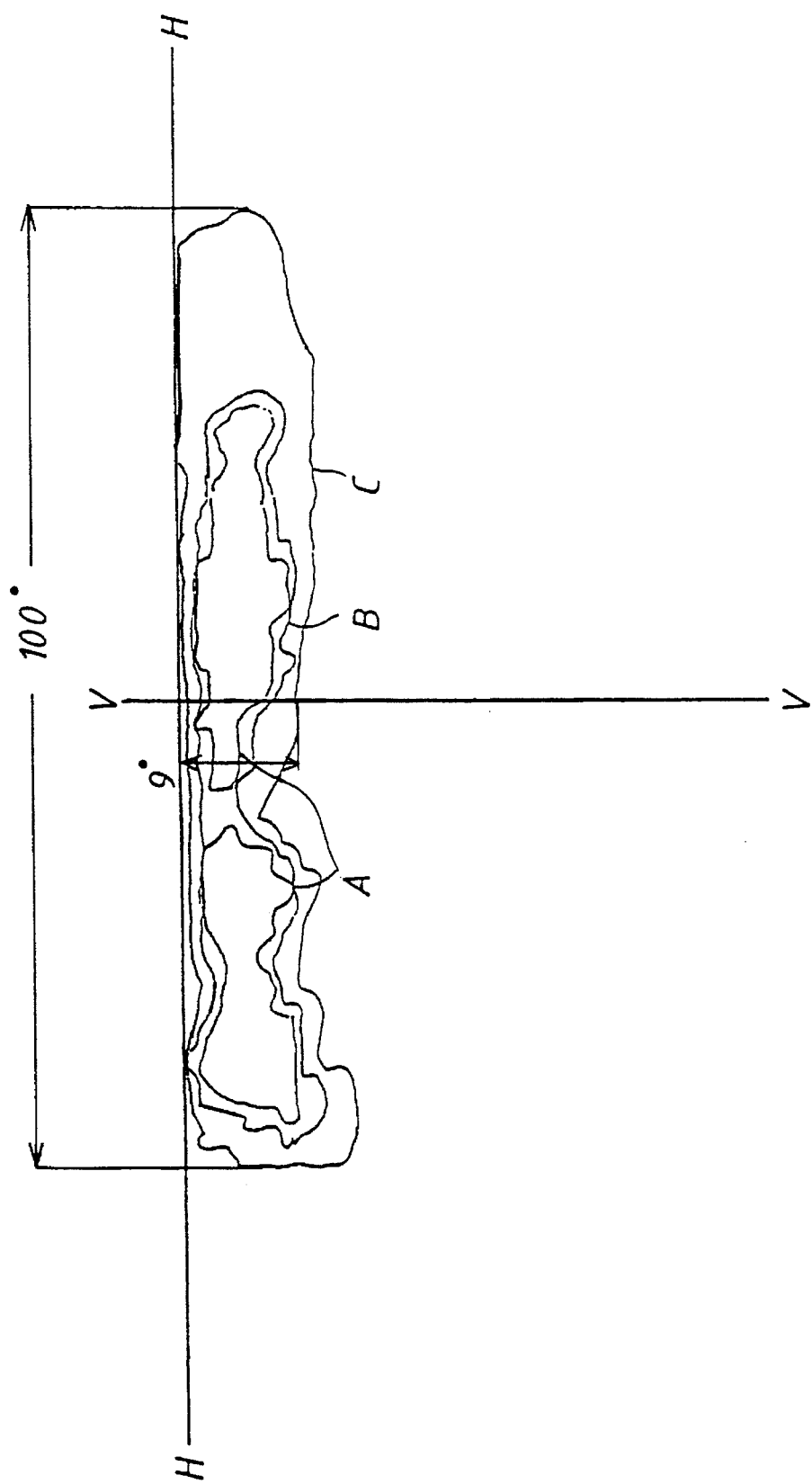
FIG. 2 is a chart showing illumination characteristics of a first lens for a flat zone illumination according to the first embodiment.

FIG. 2 is a chart of illumination characteristics of the first lens member according to the first embodiment on a screen 10 m located in front of the first lens member when the curved angle γ of the curved portion is 83 degree and the inclined angle α is 15 degree. A curved line A represents a zone where the illuminance is 60 lux, a curved line B represents a zone where the luminance is 40 lux and a curved line C represents a zone where the luminance is 20 lux.

Figure 9:
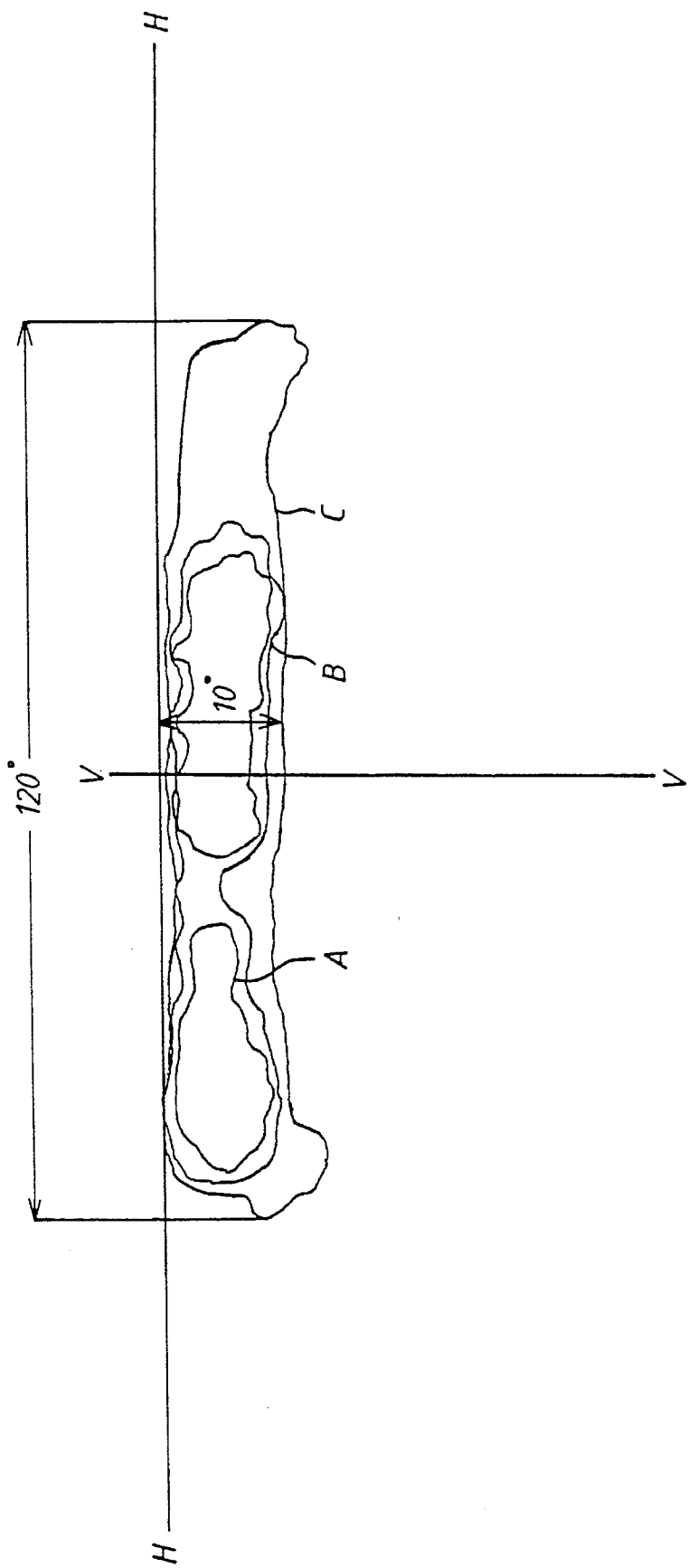
FIG. 9 is a chart showing illumination characteristics of the first lens for a flat zone illumination of the lens unit illustrated in FIG. 7 and FIG. 8.

The zone C is 9degree high (in a V—V direction) and 100 degree wide (in a H—H direction). Both height and width are narrowed and the brightness of respective zones A, B and C increases as compared to the illumination shown in FIG. 9.

Since the curved angle of the curved portion is less than 90 degree, it can be produced easier at a reduced cost.

(Second Embodiment)

Figure 3A:
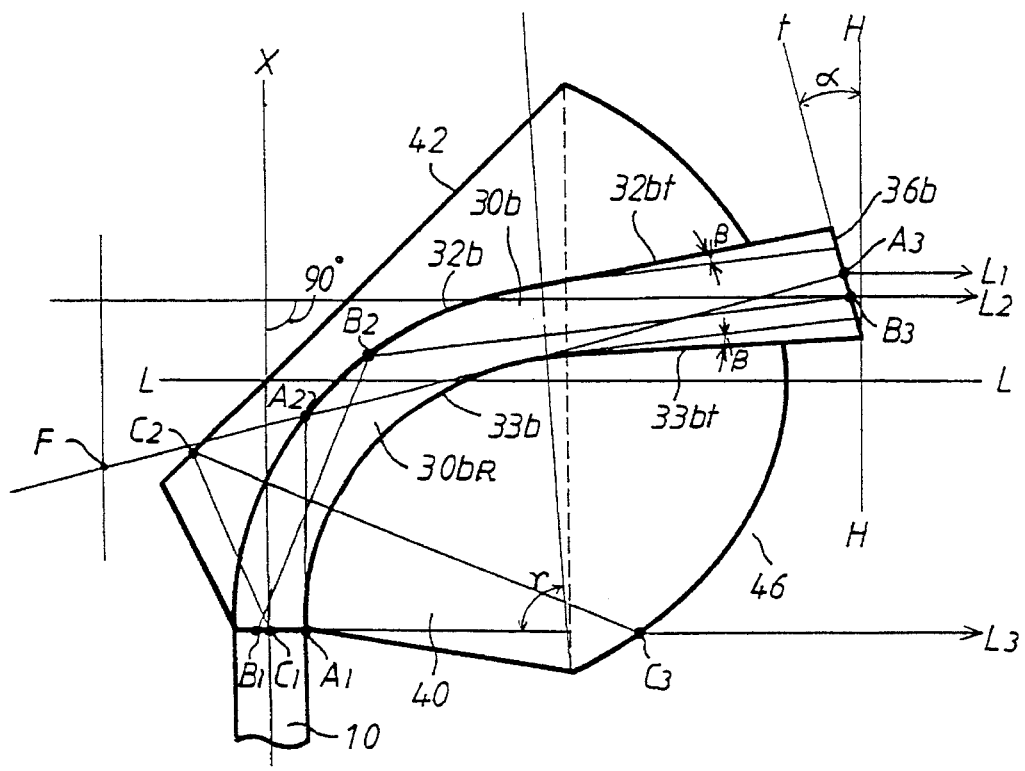
FIG. 3A is a schematic plan view and FIG. 3B is a schematic side view illustrating respectively a main part of a lens unit according to a second embodiment of the present invention.
Figure 3B:
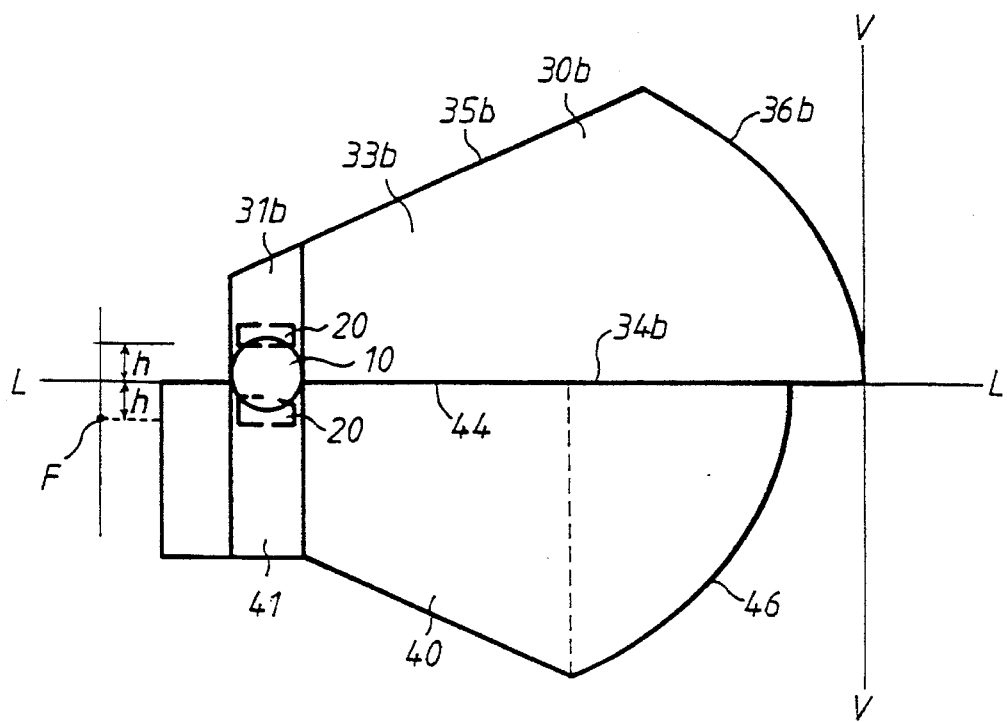

FIG. 3A and FIG. 3B are respectively plan and side views illustrating a lens unit according to a second embodiment of the present invention. A second lens 40 for the hot zone illumination is the same as that of the first embodiment, and therefore further description is omitted. The same reference numerals in the figures represent the same parts or portions as the first embodiment.

A first lens member 30b is provided with an incident surface 31b for receiving light beams from the fiberoptic cable 10, a vertically-arc-shaped light emitting surface 36b (cylindrical lens portion), vertical side walls 32b and 33b which have inclined surfaces 32bt and 33bt gradually separating from each other toward the light emitting surface 36b and provide vertical reflecting surfaces, a curved portion 30bR formed along with the walls 32b and 33b.

The curved portion 30bR is formed to have a curved angle γ which is less than 90 degree, for instance, between 80 and 85 degree, preferably, 83 degree as in the first embodiment.

The inclination angle β of inclined surfaces 32bt and 33bt is between 2 degree and 6 degree, preferably, 4degree in the second embodiment. The inclined surfaces 32b and 33b narrow the light beams emitting from the first lens member 30 or the width of the flat illumination zone in front of the vehicle.

The light emitting surface 36b of the first lens is directed so that a horizontal tangential line t of the light emitting surface 36b inclines at an angle α between 12 degree and 18 degree, preferably, 15 degree to a line H—H which is parllel to the axis of the incident light beams of the first tens. In other words, the normal line of the light emitting surface 36b inclines at the angle α from the light beams emitted from the second lens member 40, so that the light beams emitted from the light emitting surface 36b are refracted by a half of the inclined angle α to the right(the opposite direction of inclination of the surface 36a) and become in parallel with the light axis L—L of the second lens member 40.

The focal point of the cylindrical lens of the light emitting surface 36b is located at a point F and the focal length is equal to the shortest optical path A1–A2–A3 in FIG. 3. The point A1 of the shortest optical path is located symmetrical to the focal point F with respect to a line tangent to the point A2. The focal point F is located vertically (in a direction V—V) h, which is a half of an opening between the shade members, lower than the bottom surface 34b as shown in FIG. 3B.

An incident light beam at the point A1 on the incident surface 31b is reflected at the point A2 on the left wall 32b, refracted at the point A3 of the light emitting surface 36b and emitted therefrom as a light beam L1 in parallel with the light axis L—L. On the other hand, a light beam incident at a point B1 of the light incident surface 31b is reflected at a point B2 of the left wall 32b, refracted at a point B3 on the light emitting surface 36b and emitted therefrom as a light beam L2 in parallel with the light axis L—L as in the first embodiment.

Figure 4A:
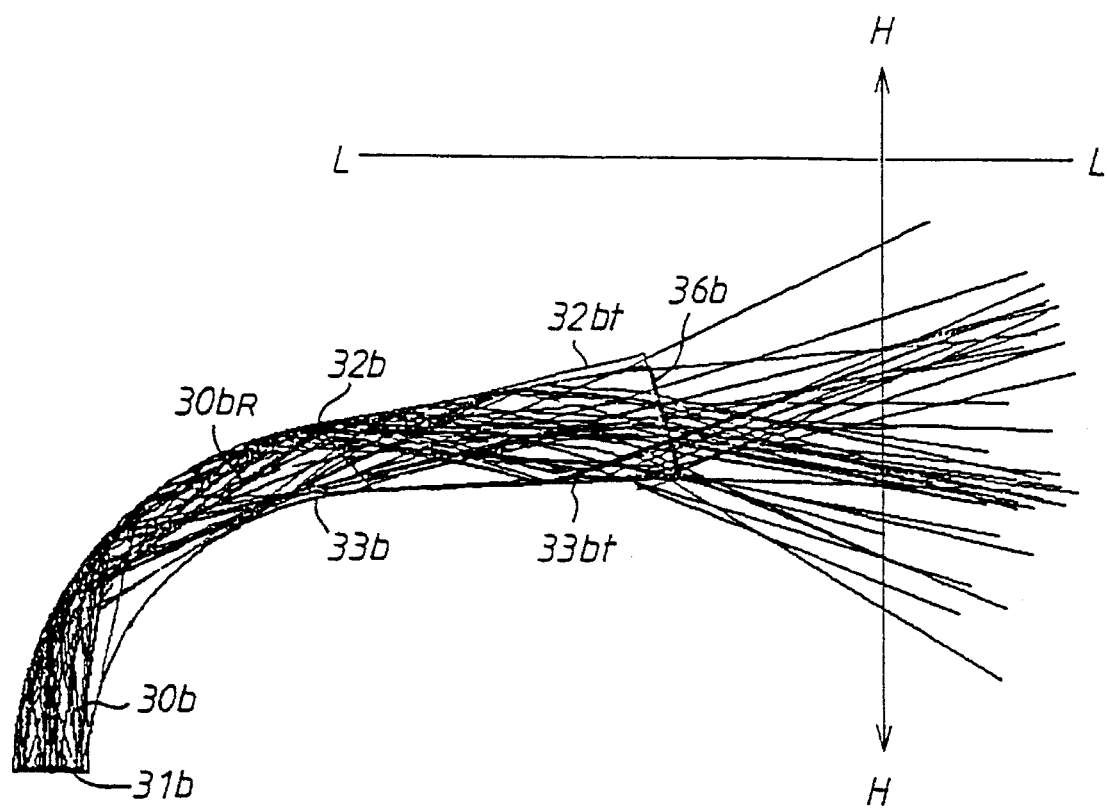
FIG. 4A and FIG. 4B are plan and side views depicting respectively paths of light beams emanating from the first lens.
Figure 4B:
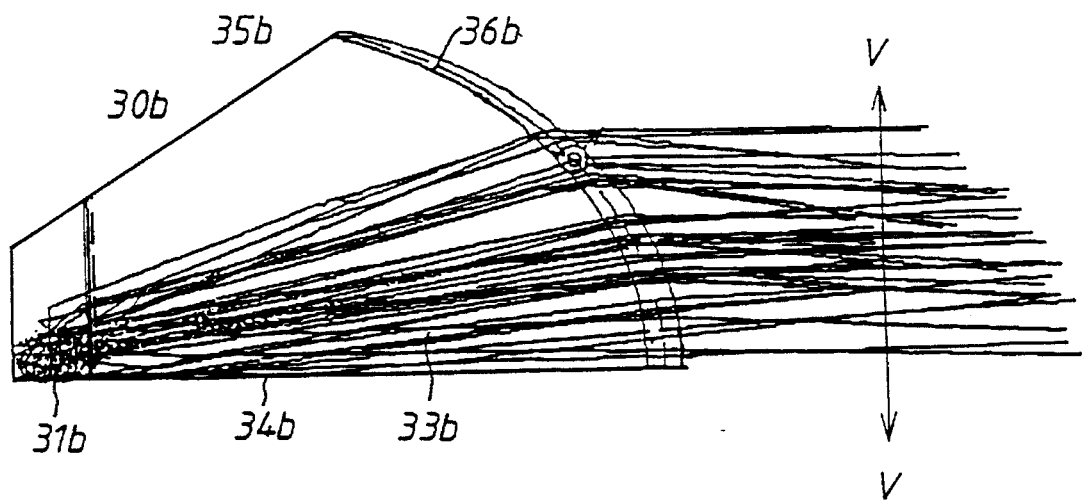

FIG. 4A and FIG. 4B are plan and side views depicting respectively paths of light beams emanating from the first lens. It is well understood that the light beams are refracted at the light emitting surface 36b as well as in the curved portion 30bR and that both inclined surfaces 32bt and 33bt narrow the light beam in the horizontal direction (in the direction H—H) as depicted in FIG. 4A. It is also well understood that the light beams are collimated vertically by the cylindrical lens portion of the light emitting surface 36b and are totally reflected by the bottom surface 34b without loss as depicted in FIG. 4B.

Figure 5:
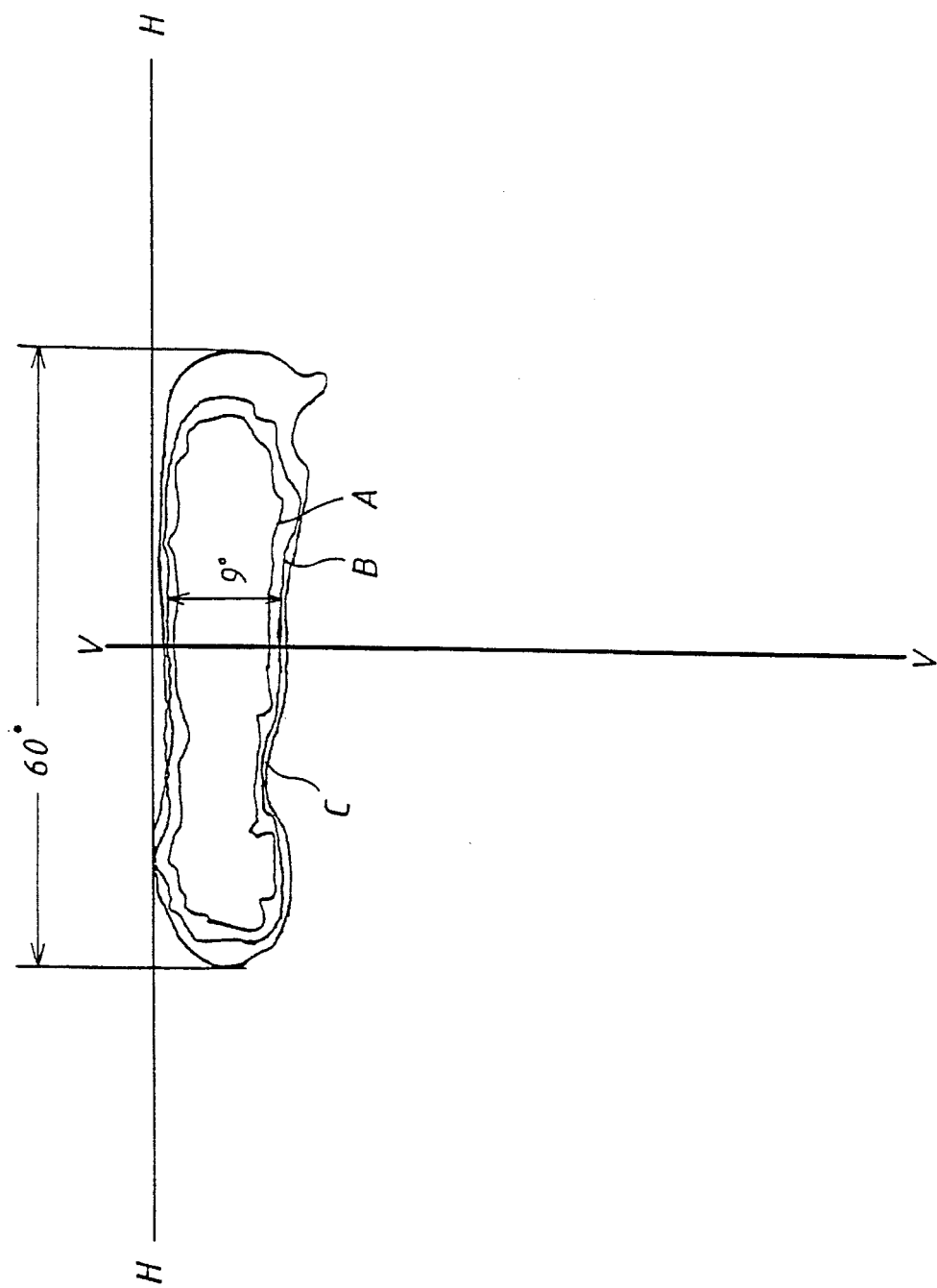
FIG. 5 is a chart showing illumination characteristics of a first lens for a flat zone illumination according to the second embodiment.

FIG. 5 is a chart of illumination characteristics of the first lens member 30b according to the second embodiment on a screen 10 m in front of the first lens member 30b when the curved angle γ of the curved portion 30bR of the second embodiment is 83 degree, the inclined angle α is 15 degree and inclined angle α of the inclined surface 32bt and 33bt is 4 degree. A curved line A represents a zone where the illuminance is 60 lux, a curved line B represents a zone where the luminance is 40 lux and a curved line C represents a zone where the luminance is 20 lux.

The zone C is 9 degree high (in a V—V direction) and 60 degree wide (in a H—H direction). Both height and width are narrowed so that the brightness of respective zones A, B and C increases as compared to the illumination shown in FIG. 2 and FIG. 9. Only one zone surrounded by the curved line A appears, thereby providing more preferable illumination is provided.

The width of the illumination can be changed with ease by changing the inclination of inclined surfaces 32bt and 33bt.

In the foregoing discussion of the present invention, the invention has been described with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than a restrictive, sense.

What is claimed is:

1. A headlight for a vehicle comprising a light source, a first lens member for forming light beams into a flat zone illumination and a second lens member for forming said light beams into a desired profile of a hot illumination zone, a fiberoptic cable for introducing light beams from said light source to said first and second lens members, wherein said first lens member comprises:
   a light incident surface for receiving light beams from said fiberoptic cable;
   a vertically arc-shaped light emitting surface for emitting said light beams, said light emitting surface having a normal line with a designated inclination to an axis of light beams emitted from said second lens member so as to refract said light beams to a direction parallel to said axis; and
   a curved portion disposed between said light incident surface and said light emitting surface for turning direction of said light beam from said light incident surface at a designated angle to said light emitting surface, said curved portion including vertical and horizontal reflecting surfaces introducing said light beam from said light incident surface to said light emitting surface.

2. A headlight for a vehicle claimed in claim 1, wherein said designated angle of said curved portion is less than 90 degree.

3. A headlight for a vehicle claimed in claim 1, wherein vertical reflecting surfaces comprise inclined surfaces gradually separating from each other at an angle toward said light emitting surface for narrowing said light beams emitting from said light emitting surface.

4. A headlight for a vehicle claimed in any one of claim 1 through claim 3, wherein said vertically arc-shaped light emitting surface having a focal point and focal length which is equal to a shortest optical path between said light emitting surface and said light incident surface.

5. A headlight for a vehicle claimed in claim 3, wherein said angle of said inclined surfaces is between 2 degree and 6 degree.

6. A headlight for a vehicle claimed in claim 1, wherein said designated inclination of said light emitting surface is an angle between 12 degree and 18 degree.

7. A headlight for a vehicle comprising a light source, a cylindrical lens member for forming light beams into a flat zone illumination, a fiberoptic cable for introducing light beams from said light source to said cylindrical lens member, wherein said cylindrical lens member comprises:
- a light incident surface for receiving light beams from said fiberoptic cable;
- a light emitting surface having a vertically cylindrical surface whose tangential line inclines in a horizontal direction at a first angle to a light axis of said light incident surface so as to refract said light beams by a half of said first angle opposite said horizontal direction; and
- a curved light conducting portion disposed between said light incident surface and said light emitting surface for turning said light beams opposite said horizontal direction by a second angle which is less than 90 degree to said light incident surface by a half of said first angle.

8. A headlight for a vehicle claimed in claim 7, wherein said curve light conducting portion comprises vertical reflecting side surfaces gradually separating from each other at an angle toward said light emitting surface for narrowing said light beams emitting from said light emitting surface.

9. A headlight for a vehicle claimed in claim 7, wherein said vertically cylindrical surface has a focal point and focal length which is equal to a shortest optical path between said light emitting surface and said light incident surface.

10. A headlight for a vehicle claimed in claim 7, wherein said first angle of said light emitting surface is between 12 degree and 18 degree.

11. A headlight for a vehicle claimed in claim 2, wherein said designated inclination of said light emitting surface is an angle between 12 degree and 18 degree.

12. A headlight for a vehicle claimed in claim 11, wherein said vertically arc-shaped light emitting surface having a focal point and focal length which is equal to a shortest optical path between said light emitting surface and said light incident surface.

13. A headlight for a vehicle claimed in claim 12, wherein vertical reflecting surfaces comprise inclined surfaces gradually separating from each other at an angle toward said light emitting surface for narrowing said light beams emitting from said light emitting surface.

14. A headlight for a vehicle claimed in claim 13, wherein said angle of said inclined surfaces is between 2 degree and 6 degree.

* * * * *